United States Patent
Van Der Sijde et al.

(10) Patent No.: US 10,771,717 B2
(45) Date of Patent: Sep. 8, 2020

(54) USE OF IR PRE-FLASH FOR RGB CAMERA'S AUTOMATIC ALGORITHMS

(71) Applicant: Lumileds LLC, San Jose, CA (US)

(72) Inventors: Arjen Van Der Sijde, Eindhoven (NL); Nicola Pfeffer, Eindhoven (NL); Charles Schrama, San Jose, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/258,087

(22) Filed: Jan. 25, 2019

(65) Prior Publication Data

US 2020/0036914 A1    Jan. 30, 2020

Related U.S. Application Data

(63) Continuation-in-part of application No. 16/049,480, filed on Jul. 30, 2018.

(30) Foreign Application Priority Data

Aug. 30, 2018 (EP) .................................. 18191725

(51) Int. Cl.
*H04N 5/33* (2006.01)
*H04N 13/271* (2018.01)
*H04N 9/31* (2006.01)
*H04N 5/232* (2006.01)
*G06T 7/521* (2017.01)

(52) U.S. Cl.
CPC ............ *H04N 5/332* (2013.01); *G06T 7/521* (2017.01); *H04N 5/23212* (2013.01); *H04N 9/3182* (2013.01); *H04N 13/271* (2018.05)

(58) Field of Classification Search
CPC .. H04N 5/332; H04N 13/271; H04N 5/23212; H04N 9/3182; G06T 7/521

USPC .......................................................... 348/164
See application file for complete search history.

(56) References Cited

U.S. PATENT DOCUMENTS

| 7,493,035 B2 | 2/2009 | Kuo et al. |
| 7,566,855 B2 | 7/2009 | Olsen et al. |
| 8,553,089 B2 | 10/2013 | Noguchi |

(Continued)

FOREIGN PATENT DOCUMENTS

| EP | 1811771 | 7/2007 |
| EP | 2605505 | 6/2013 |
| WO | 2011/047214 | 4/2011 |

OTHER PUBLICATIONS

"U.S. Appl. No. 16/049,480, Non Final Office Action dated Jul. 10, 2019", 16 pgs.
"U.S. Appl. No. 16/049,480, Response filed Oct. 8, 2019 to Non-Final Office Action dated Jul. 10, 2019", 11 pgs.

(Continued)

*Primary Examiner* — Thai Q Tran
*Assistant Examiner* — Nienru Yang
(74) *Attorney, Agent, or Firm* — Schwegman Lundberg & Woessner, P.A.

(57) ABSTRACT

The image capture system of the present disclosure comprises an illuminator comprising at least one infrared light LED or laser and one visible light LED, an image sensor that is sensitive to infrared light and visible light, a memory configured to store instructions, and a processor configured to execute instructions to cause the image capture system to emit infrared light, receive image data comprising at least one infrared image, and determine depth maps, visible focus settings, or infrared exposure settings based on the infrared image data.

17 Claims, 6 Drawing Sheets

(56) References Cited

U.S. PATENT DOCUMENTS

| | | | |
|---|---|---|---|
| 9,420,248 B2 | 8/2016 | Velarde et al. | |
| 9,704,250 B1* | 7/2017 | Shah | G06T 7/0065 |
| 2007/0127908 A1 | 6/2007 | Oon et al. | |
| 2008/0062123 A1* | 3/2008 | Bell | G06F 3/011 |
| | | | 345/156 |
| 2008/0166112 A1 | 7/2008 | Takematsu | |
| 2011/0211073 A1 | 9/2011 | Foster | |
| 2013/0033593 A1* | 2/2013 | Chinnock | A61B 3/14 |
| | | | 348/78 |
| 2013/0050426 A1* | 2/2013 | Sarmast | G01S 17/89 |
| | | | 348/46 |
| 2013/0155253 A1* | 6/2013 | Wood | H04N 5/2256 |
| | | | 348/164 |
| 2014/0368662 A1 | 12/2014 | Venkataraman et al. | |
| 2016/0088278 A1 | 3/2016 | Velarde et al. | |
| 2018/0007240 A1 | 1/2018 | Rivard et al. | |

OTHER PUBLICATIONS

"International Application Serial No. PCT/US2019/044242, International Search Report dated Sep. 13, 2019", 2 pgs.

"International Application Serial No. PCT/US2019/044242, Written Opinion dated Sep. 13, 2019", 6 pgs.

"U.S. Appl. No. 16/049,480, Final Office Action dated Nov. 15, 2019", 22 pgs.

"International Application Serial No. PCT/US2019/044241, International Search Report dated Oct. 17, 2019", 2 pgs.

"International Application Serial No. PCT/US2019/044241, Written Opinion dated Oct. 17, 2019", 7 pgs.

"U.S. Appl. No. 16/049,480, Response filed Jan. 15, 2020 to Final Office Action dated Nov. 15, 2019", 12 pgs.

"U.S. Appl. No. 16/049,480, Advisory Action dated Feb. 5, 2020", 4 pgs.

"U.S. Appl. No. 12/775,000, Appeal Brief filed Apr. 13, 2020", 20 pgs.

* cited by examiner

USE OF IR PRE-FLASH FOR RGB CAMERA'S AUTOMATIC ALGORITHMS

CROSS REFERENCE TO RELATED APPLICATION(S)

This application is a continuation-in-part of U.S. patent application Ser. No. 16/049,480, filed Jul. 30, 2018, which is incorporated by reference as if fully set forth. This application also claims the benefit of EP Patent Application No. 18191725.3, filed on Aug. 30, 2018, which is incorporated by reference as if fully set forth.

FIELD OF INVENTION

The present invention relates to an image capture system, and more particularly to an image capture system having an invisible light pre-flash.

BACKGROUND

Pictures taken with an automatic camera typically require an automatic focus mechanism, an automatic exposure mechanism, and an automatic white balance mechanism for a focused, well-exposed, and white-balance picture. When a picture is taken in the dark, this is typically provided during preview mode and assisted by a visible light pre-flash. During the visible light pre-flash, visible light is emitted from the camera. The camera then receives visible image data based on the visible light pre-flash. Next, the three algorithms of automatic focus, automatic exposure, and automatic white balancing run to calculate suitable focus settings, exposure settings, and white balance settings.

Pre-flash is typically one to a few seconds long depending on the ambient lighting of the target scene. This relatively long visible light pre-flash may result in glare of the persons having their picture taken. Further, visible light pre-flash may indicate to a person that their picture is being taken, resulting in the person moving, changing the expression of their face, etc. Therefore, an invisible light pre-flash may result in a better final picture. As such, it would be advantageous to have an image capture system in which the length of the visible light pre-flash is reduced or eliminated.

SUMMARY

The present disclosure describes an image capture system having an invisible light pre-flash. In one embodiment, infrared light is emitted during pre-flash. Since infrared light is barely visible, the distracting glare by the pre-flash is reduced or eliminated. The image capture system of the present disclosure comprises an infrared illuminator comprising at least one infrared light or laser, an image sensor that is sensitive to infrared light, a memory configured to store instructions, and a processor configured to execute instructions to cause the image capture system to emit infrared light as a pre-flash, receive image data comprising at least one infrared image, and determine infrared exposure settings based on the infrared image data. Although the image capture system of the present disclosure is described as having an illuminator configured to emit infrared light, the illuminator may be configured to emit other invisible light. For example, in an alternate embodiment, the illuminator is configured to emit UV light during pre-flash. In such an embodiment, the image sensor is configured to detect UV light.

DETAILED DESCRIPTION OF THE PREFERRED EMBODIMENTS

Automatic focus may be achieved through contrast detection. Contrast detection measures the contrast within a sensor field through the lens. The intensity difference between adjacent pixels of the sensor increases with correct image focus. The optical system is adjusted until maximum contrast is detected. Contrast detection focus may be performed using visible light and/or infrared light. When infrared light is used, a small correction factor may be necessary should the camera lens properties be slightly wavelength dependent. Further, broadband infrared light may increase the correlation between object reflectivity in infrared compared to visible R, G, B and augment contrast between different objects. This may improve the best focus detection algorithm results for certain scenes. Additionally or alternatively, in some embodiments object recognition methods, such as face recognition, may be used to make even better size-distance and edge predictions, thereby further improving focal algorithms.

In a typical image capture device, light enters through an aperture and is directed to an image sensor by at least one optical element, such as a lens. Automatic exposure is an automated system that sets the aperture and/or shutter speed based on external lighting conditions by measuring the light in the frame. Automatic exposure mechanisms typically use reflected visible light for a visible camera and reflected infrared light for an infrared camera. In the present disclosure, infrared light is emitted during pre-flash and the reflected infrared light is used to predict the exposure of the visible final image. The infrared exposure settings are then scaled to visible exposure settings. Although the conversion from infrared light to visible light is less than perfect, the deviation between infrared light and visible light is contained within an acceptable range. In addition, appropriate correction factors may be applied. Further, broadband infrared light may increase the correlation between object reflectivity in infrared compared to visible R, G, B. Additionally or alternatively, object recognition methods, such as face recognition, may be used to make an improved prediction.

Automatic white balance is an automated system that removes color casts so that objects which appear white in person are rendered white in a photograph. Although an infrared image does not contain color information, automatic white balancing mechanisms may use the ambient white balance settings or, in the dark, use pre-defined LED-white balancing matrix. Additionally or alternatively, white balance settings may be fine-tuned during post-processing.

Figure 1:
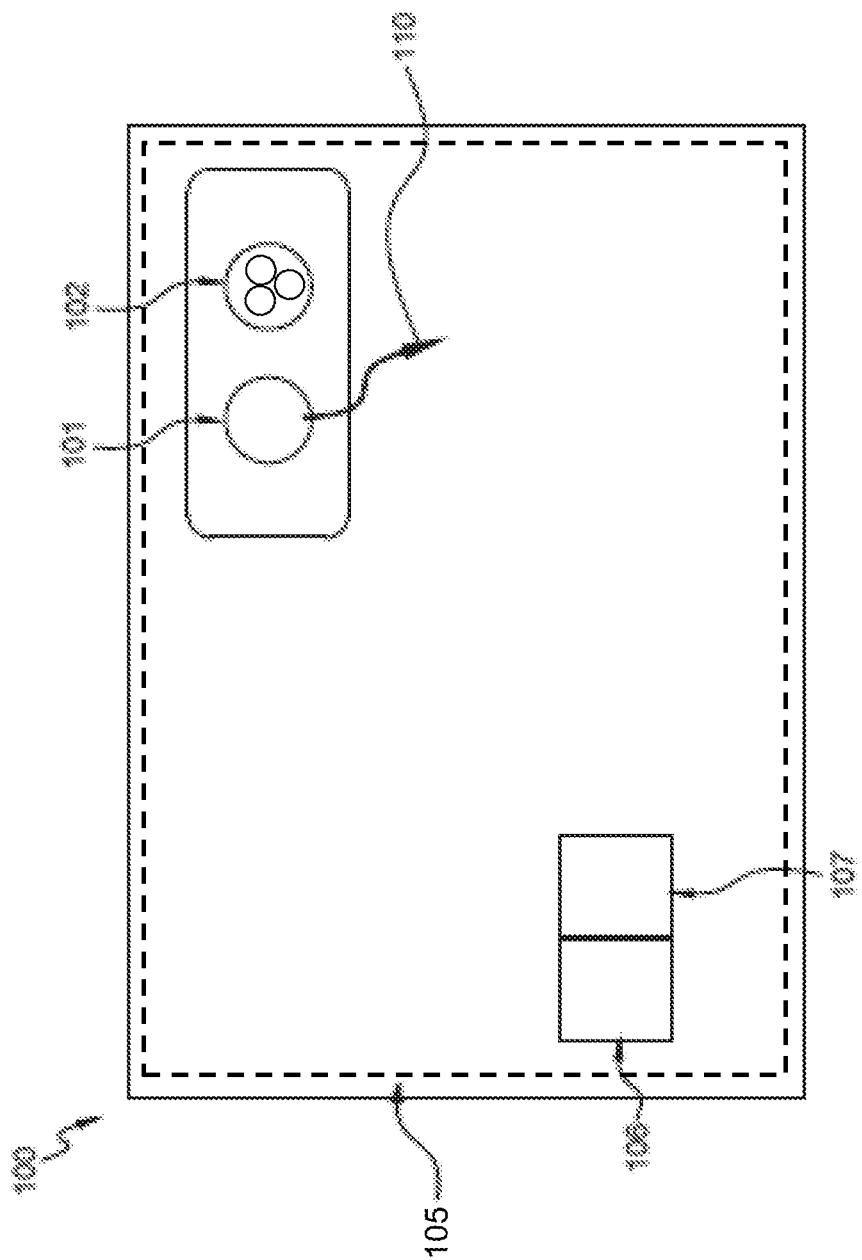
FIG. 1 illustrates a user device comprising an image capture system of the prior art which uses visible light pre-flash.

FIG. 1 illustrates a user device 100 comprising an image capture system of the prior art 105 comprising an illuminator 101, an image sensor 102, a memory 106 for storing instructions, and a processor 107 for executing instructions. The illuminator 101 is a visible light illuminator such as an flash LED. When the image capture system 105 is activated, the processor 107 executes instructions to cause the illuminator 101 to emit visible light 110 during a pre-flash. The image sensor 102 then receives image data comprising at least one visible light image. The processor 107 then executes algorithms to determine a proper exposure settings, focus settings, and white balance settings using the image data comprising the at least one visible light image. The exposure settings, focus settings, and white balance settings are then adjusted according to the calculated exposure settings, focus settings, and white balance settings, respectively.

The visible light 110 pre-flash of the image capture system of the prior art 105 is typically one to a few seconds long. This relatively long pre-flash may have undesirable effects, such as glare of the persons having their picture taken.

Figure 2:
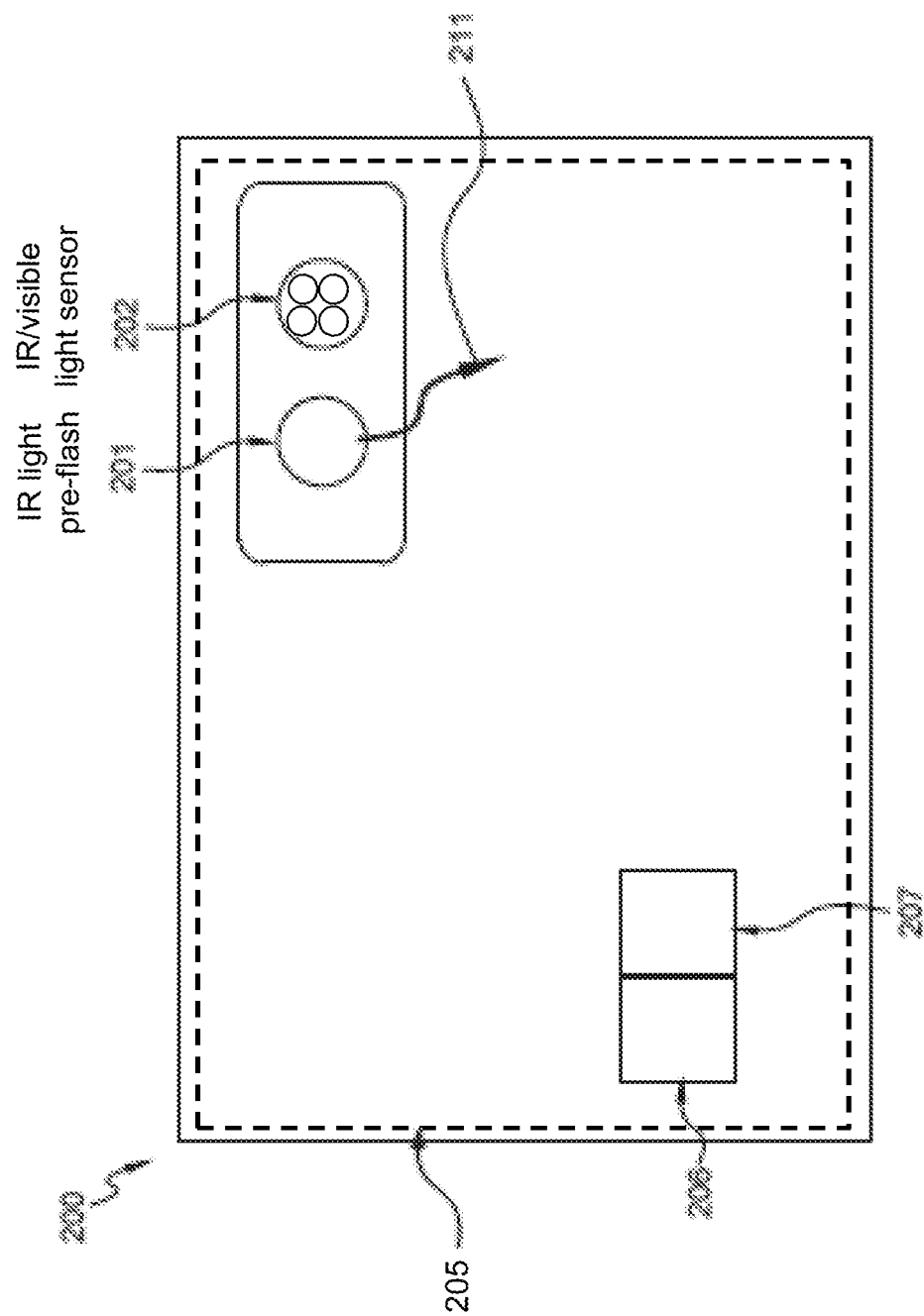
FIG. 2 illustrates a user device comprising an embodiment of the image capture system of the present disclosure having a single four color pixel camera.

FIG. 2 illustrates a user device 200 comprising one embodiment of the image capture system of the present disclosure 205 which comprises an illuminator 201, an image sensor 202, a memory 206 for storing instructions, and a processor 207 for executing instructions. The user device may be a mobile phone, tablet, digital camera, or any other device that may utilize an image capture system.

The illuminator 201 is a combination of at least one visible light LED and at least one infrared illuminator such as an infrared LED or laser. In one embodiment, the at least one visible light LED may emit light having a wavelength of 350-800 nm and the at least one infrared LED or laser may emit light having a wavelength of 600-2500 nm. As such, the illuminator 201 is capable of emitting both visible light and infrared light 211.

The image sensor 202 of image capture system 205 is sensitive to ranges of wavelengths of both infrared light and visible light. In one embodiment, the image sensor 202 is sensitive to wavelengths of 350-2500 nm. As such, the image sensor 202 is capable of detecting both visible light and infrared light.

In a preferred embodiment, the image sensor 202 comprises at least two pixel types. In one embodiment, the image sensor 202 comprises four pixel types. In a further embodiment, the image sensor 202 comprises the following four pixel types: R, G, B, and clear/infrared. In a further embodiment, the infrared pixel of image sensor 202 is a stack of R, G, and B filters which avoid overexposure of the infrared pixel compared to the R, G, and B (visible light) pixels.

When the image capture system 205 is activated, the processor determines whether flash is required. If flash is required, the processor executes instructions to cause the illuminator 201 to emit infrared light 211 during a pre-flash. The image sensor 202 then receives image data comprising at least one infrared light image. The processor 207 executes algorithms to determine infrared exposure settings using the image data comprising the at least one infrared image. The processor 207 then scales the infrared exposure settings to visible exposure settings. The exposure is then adjusted according to the determined exposure settings.

In one embodiment, the processor 207 is further configured to execute instructions to cause the image capture system 205 to determine infrared focus settings based on the infrared image data. The infrared focus settings may correspond to the focus position of the lens. In a further embodiment, the processor 207 then scales the infrared focus settings to visible focus settings. The focus is then adjusted according to the determined focus settings. Additionally or alternatively, the illuminator 201 and the image sensor 202 are configured to generate a depth map based on the at least one infrared image. The depth map generated by the illuminator 201 and the image sensor 202 contains information relating to the distance of the surfaces of objects in the target scene and may be used to determine the best focus position for the image capture system 200. Depth map generation can be based on stereovision, structured lighting or time of flight (TOF) camera measurements.

In addition to using depth maps for focus settings, depth maps created using infrared image data based on illumination by an infrared LED or laser can be used to adjust flash intensity or camera exposure settings. Alternatively, or in addition, in some embodiments structured or patterned illumination by an infrared LED or laser can be used to assist or directly provide depth information for a scene.

In one embodiment, infrared LEDs or lasers with individually addressable segments can be used to form a structured light pattern (e.g. light stripes) and also allow for the structured light to dynamically adapt to the scene. For example, an IR LED or laser matrix of about 10×10 segments can be used, with each segment being driven independently in combination with associated infrared imaging optics. This arrangement allows various illumination patterns to be generated. Knowing the projected illumination pattern allows calibration and generation of distance information. Advantageously, manufacturing requirements for associated infrared optics are reduced by this solution, and efficiency can be maximized since there is no need for light absorbing elements or mask in the light path. Pattern generation in two directions can also give redundancy to secure the correct distance information.

In other embodiments, a segmented infrared LED or laser could be used in combination with a single infrared time-of flight (TOF) detector for depth mapping. While this solution will have a reduced lateral resolution as compared to optical camera systems, it would provide a useful, inexpensive, and very fast way to create depth map.

When a picture is taken in ambient light, the processor 207 is configured to determine white balance settings according to an algorithm. The white balance settings are then adjusted according to the determined white balance settings. When a picture is taken in the dark, i.e., where there is no ambient light present in the target scene, the light emitted during flash is the dominant light source. In this scenario, pre-defined white balance settings tuned to the flash illuminator may be selected for the white balance settings. Additionally or alternatively, face and object recognition may be used as information for the automatic white balancing mechanism. Additionally or alternatively, white balance settings may be fine-tuned post-processing.

After the exposure, focus, and white balance settings have been adjusted to their determined settings, the processor 207 executes instructions to cause the illuminator 201 to emit visible light during a flash. The image sensor 202 then captures the final image.

Although the image capture system 205 of the present disclosure is described as having an illuminator 201 configured to emit infrared light, the illuminator 201 may be configured to emit other invisible light. For example, in an alternate embodiment, the illuminator 201 is configured to emit UV light during pre-flash. In such an embodiment, the image sensor 201 is configured to detect UV light.

The use of a single image sensor 202 to provide infrared image data and the visible image data reduces the number of components within the image capture system, further allowing for manufacturing more compact image capture systems.

Figure 3:
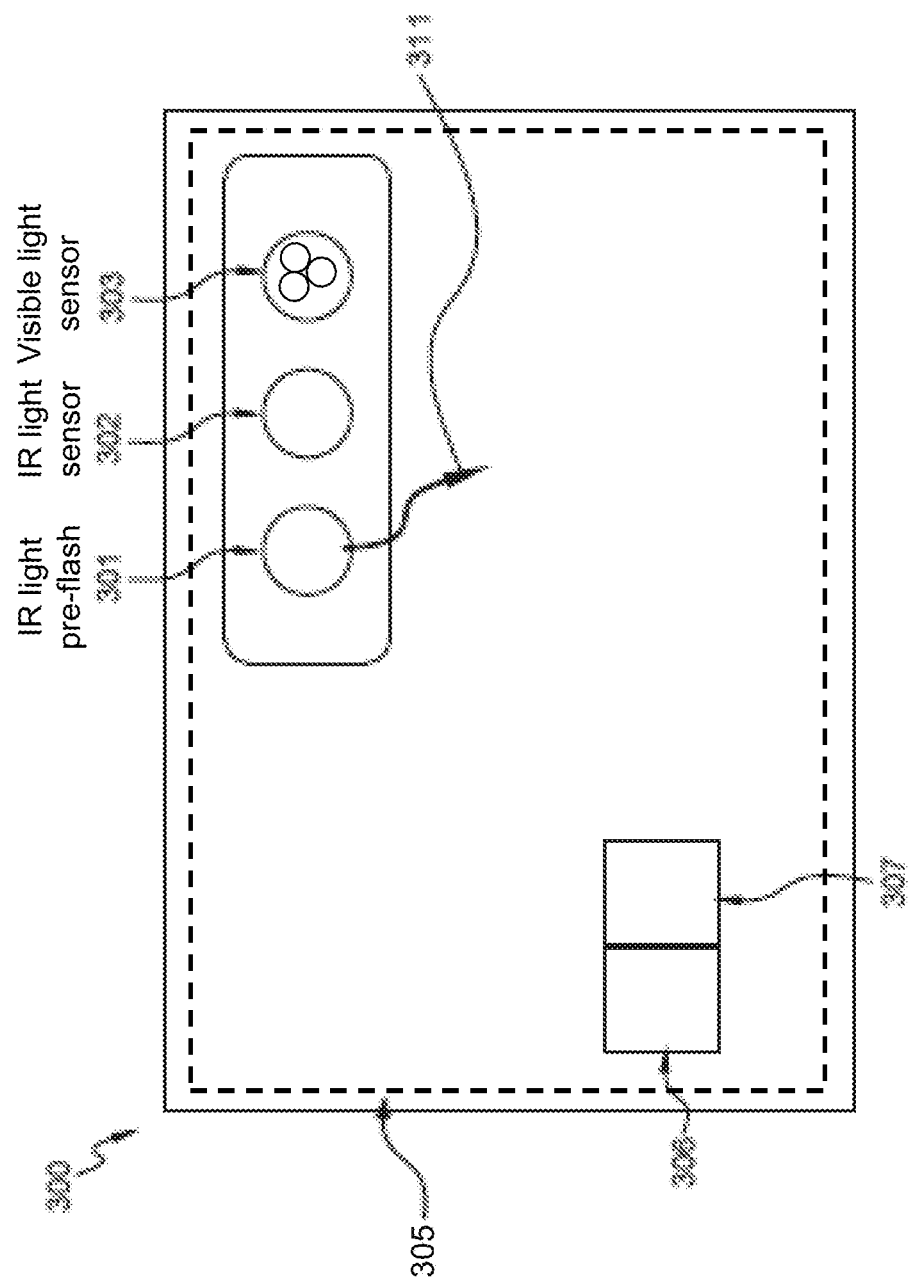
FIG. 3 illustrates a user device comprising an alternate embodiment of the image capture system of the present disclosure having two or more cameras.

In an alternate embodiment, the image capture system of the present disclosure comprises at least two image sensors comprising at least one image sensor having a sensitivity to a range of wavelengths of infrared light at least one image sensor having a sensitivity to a range of wavelengths of visible light. FIG. 3 illustrates a user device 300 comprising an embodiment of the image capture system of the present disclosure 305 comprising an illuminator 301, a first image sensor 302, a second image sensor 303, a memory 306 for storing instructions, and a processor 307 for executing instructions. The user device may be a mobile phone, tablet, digital camera, or any other device that may utilize an image capture system.

The illuminator 301 is a combination of at least one visible light LED and at least one infrared LED or laser. In one embodiment, the at least one visible light LED emits light having a wavelength within a range of 350-800 nm and the at least one infrared LED or laser emits light having a wavelength within a range of 600-2500 nm. As such, the illuminator 301 is capable of emitting both visible light and infrared light 311.

The first image sensor 302 is sensitive to infrared light. In one embodiment, the first image sensor 302 is sensitive to light having a wavelength within a range of 600-2500 nm. The second image sensor 303 is sensitive to visible light. In one embodiment, the second image sensor 302 is sensitive to light having a wavelength within a range of 350-800 nm. In a preferred embodiment, there is an appropriate correlation function between the first image sensor 302 and the second image sensor 303. In a further embodiment, the first image sensor 302 and the second image sensor 303 are calibrated against each other for at least one of automatic focus, automatic exposure, and automatic white balance.

A person having ordinary skill in the art will recognize the advantages of an image capture system having at least two sensors, comprising at least one image sensor having a sensitivity to a range of wavelengths of infrared light at least one image sensor having a sensitivity to a range of wavelengths of visible light. For example, a single four color pixel image sensor comprising R, G, B, and clear/infrared pixels may be compromised due to the lack of infrared filter. Where there are at least two sensors comprising at least one image sensor having a sensitivity to a range of wavelengths of infrared light at least one image sensor having a sensitivity to a range of wavelengths of visible light, the image sensor having a sensitivity to a range of wavelengths of visible light is not compromised due to the lack of infrared filter.

Although the image capture system 305 illustrated in FIG. 3 is shown as having two image sensors, there may be more than two image sensors comprising at least one image sensor having a sensitivity to a range of wavelengths of infrared light and at least one image sensor having a sensitivity to a range of wavelengths of visible light. In one embodiment, the at least one image sensor having a sensitivity to a range of wavelengths of infrared light is sensitive to light having a wavelength within a range of 600-2500 nm, and the at least one image sensor having a sensitivity to a range of wavelengths of visible light is sensitive to light having a wavelength within a range of 350-800 nm.

When the image capture system comprises more than two image sensors, there is an appropriate correlation function between the at least one image sensor having a sensitivity to a range of wavelengths of infrared light and the at least one image sensor having a sensitivity to a range of wavelengths of visible light. In one embodiment, the at least one image sensor having a sensitivity to a range of wavelengths of infrared light and the at least one image sensor having a sensitivity to a range of wavelengths of visible light are calibrated against each other for at least one of automatic focus, automatic exposure, and automatic white balance.

When the image capture system 305 is activated, the processor determines whether flash is required. If flash is required, the processor 307 executes instructions to cause the illuminator 301 to emit infrared light 311 during a pre-flash. The image sensor 302 then receives image data comprising at least one infrared image. The processor 307 executes algorithms to determine exposure settings using the image data comprising the at least one infrared image. The exposure settings are then adjusted according to the determined exposure settings.

In one embodiment, the processor is further configured to execute instructions to cause the image capture system to determine infrared focus settings based on the infrared image data. The infrared focus setting may be a real lens focus position. In a further embodiment, the processor 307 scales the infrared focus settings to visible focus settings. The focus is then adjusted according to the determined focus settings.

Additionally or alternatively, the illuminator 301 capable of emitting infrared light and the image sensor 302 sensitive to range of wavelengths of infrared light are configured to generate a depth map based on the at least one infrared image. The depth map generated by the illuminator 301 and the image sensor 302 contains information relating to the distance of the surfaces of objects in the target scene and may be used to determine the best focus position of the camera lens of the image capture system 300. As previously noted with respect to the embodiment discussed with respect to FIG. 2, the depth map can be created using infrared LEDs or lasers with individually addressable segments that can be used to form a structured light pattern, by infrared TOF, or any other available infrared depth map technology.

When a picture is taken in ambient light, the processor 307 is configured to determine white balance settings according to an algorithm. The white balance settings are then adjusted according to the determined white balance settings. When a picture is taken in the dark, i.e., where there is no ambient light present in the target scene, the light emitted during flash is the dominant light source. In this scenario, pre-defined white balance settings tuned to the flash illuminator may be selected for the white balance settings. Additionally or alternatively, face and object recognition may be used as information for the automatic white balancing mechanism. Additionally or alternatively, white balance settings may be fine-tuned during post-processing.

After the exposure, focus and white balance settings have been adjusted according to the determined settings, the processor 307 executes instructions to cause the illuminator 301 to emit visible light during a flash. The image sensor sensitive to visible light 303 then captures the final image.

The use of infrared light during pre-flash significantly reduces or eliminates visible light pulse length during pre-flash. As such, the undesirable effects associated with visible pre-flash are avoided.

Although the image capture system 305 of the present disclosure is described as having an illuminator 301 configured to emit infrared light, the illuminator 301 may be configured to emit other invisible light. For example, in an alternate embodiment, the illuminator 301 is configured to emit UV light during pre-flash. In such an embodiment, at least one of the image sensors is configured to detect UV light.

Figure 4B:
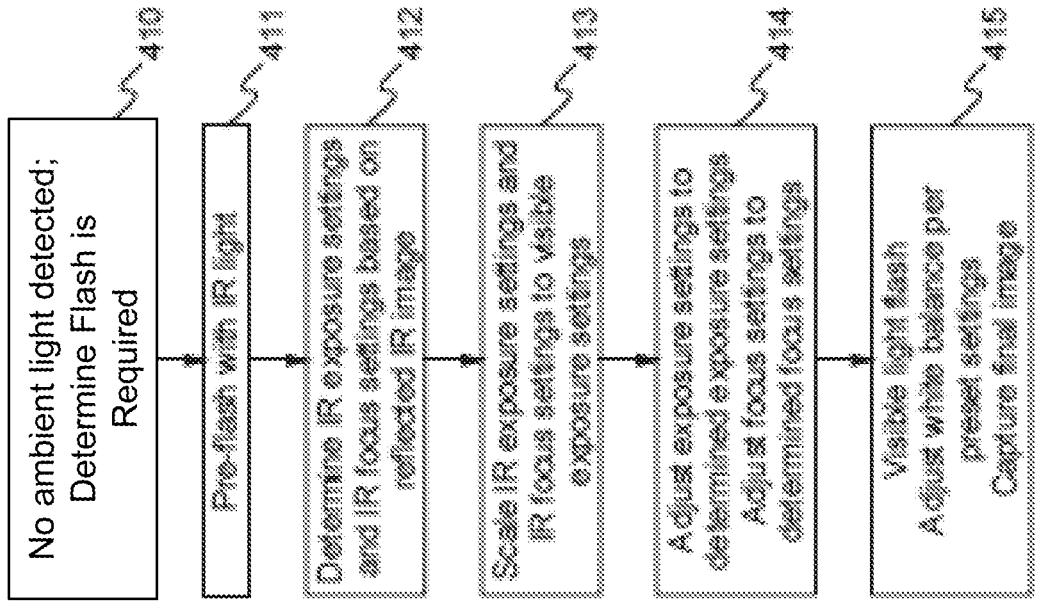
FIG. 4B is a flow chart showing a method of using the image capture system of the present disclosure in low or dark light.
Figure 4A:
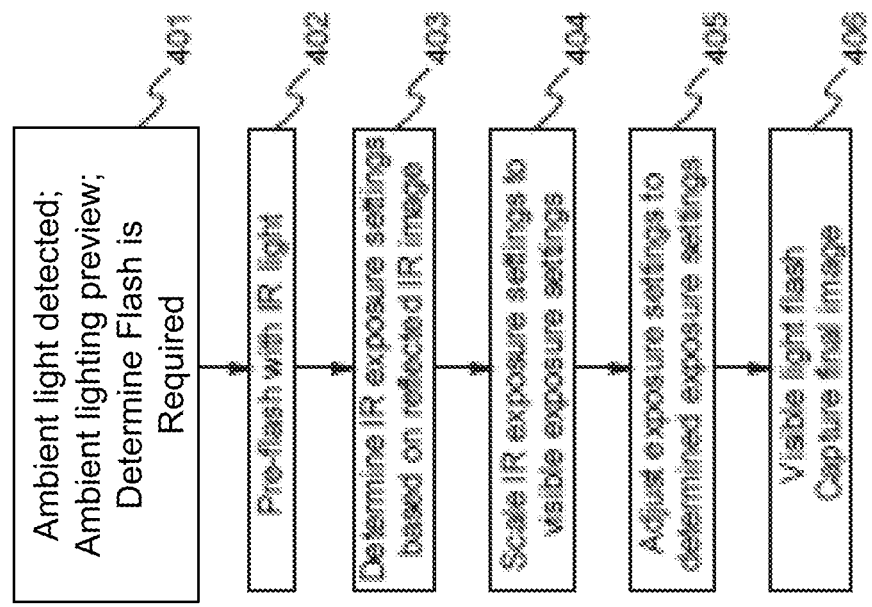
FIG. 4A is a flow chart showing a method of using the image capture system of the present disclosure in ambient light.

FIG. 4A is a flow chart showing a method of using the image capture system of the present disclosure which uses infrared light during a pre-flash when there is ambient lighting. This method may be employed on image capture system 205 or image capture system 305 of the present disclosure. If ambient light is detected in the target scene, an ambient lighting preview is performed at step 401. During this preview, algorithms are run to determine if flash and pre-flash is required. The amount of ambient light captured will determine whether flash and pre-flash is required. If the processor determines that flash is required, the processor executes instructions to cause the image capture system to emit infrared light pre-flash at step 402. The processor then executes instructions to cause the image capture system to receive image data comprising at least one infrared image and to determine infrared exposure settings based on the at least one infrared image at step 403. In some embodiments, step 403 further comprises the processor executing instructions to verify the focus position based on the infrared image. The infrared exposure settings are then scaled to visible exposure settings at step 404. If the infrared focus settings were verified in step 403, then step 404 further comprises scaling the infrared focus settings to visible focus settings. The processor then executes instructions to cause the image capture system to adjust the exposure settings to the scaled exposure settings at step 405. Finally, at step 406, the processor executes instructions to cause the image capture system to emit visible light as a flash and the image sensor captures a final visible image.

Although the method of FIG. 4A is described as having an infrared light pre-flash, the method may use other invisible light for the pre-flash. For example, in an alternate embodiment, the method comprises a UV light pre-flash at step 402. Accordingly, step 403 comprises determining UV exposure settings based on at least one UV image and step 404 comprises scaling the UV exposure settings to visible exposure settings in this embodiment.

FIG. 4B is a flow chart showing a method of using the image capture system of the present disclosure which uses infrared light during a pre-flash when there is no ambient lighting in the target scene. This method may be employed on image capture system 205 or image capture system 305 of the present disclosure. If no ambient light is detected in the target scene at step 410, the processor determines that flash is required. The processor executes instructions to cause the image capture system to emit infrared light as a pre-flash at step 411. The processor then executes instructions to cause the image capture system to receive image data comprising at least one infrared image and determine both an infrared exposure settings and infrared focus settings based on the at least one infrared image and/or depth map at step 412. In certain embodiments, a segmented infrared LED or laser with individually addressable segments can be used to illuminate uniformly a scene as necessary for an infrared flood illuminator, and yet be additionally tune light intensity in selected regions to compensate for high reflective objects or larger distances. At step 413, the infrared exposure settings are scaled to visible exposure settings and the infrared focus settings or distance measurements are scaled to visible exposure settings and visible focus settings. The processor then executes instructions to cause the image capture system to adjust the exposure settings and the focus settings to the scaled exposure settings and the scaled or calculated focus settings, respectively, at step 414. When a picture is taken in the dark, i.e., where there is no ambient light present in the target scene, the light emitted during flash is the dominant light source. A pre-defined white balance tuned to the flash illuminator may be selected for the white balance settings. Additionally or alternatively, face and object recognition may be used as information for the automatic white balancing mechanism. Additionally or alternatively, white balance may be fine-tuned during post-processing of the pictures. Therefore, at step 415, the processor executes instructions to cause the image capture system to emit visible light as a flash, the white balance is adjusted per the pre-defined settings, and the final image is captured.

Although the method of FIG. 4B is described as having an infrared light pre-flash, the method may use other invisible light for the pre-flash. For example, in an alternate embodiment, the method comprises a UV light pre-flash at step 411. Accordingly, step 412 comprises determining UV exposure settings and UV focus settings based on at least one UV image and step 413 comprises scaling the UV exposure settings to visible exposure settings in this embodiment.

Figure 5:
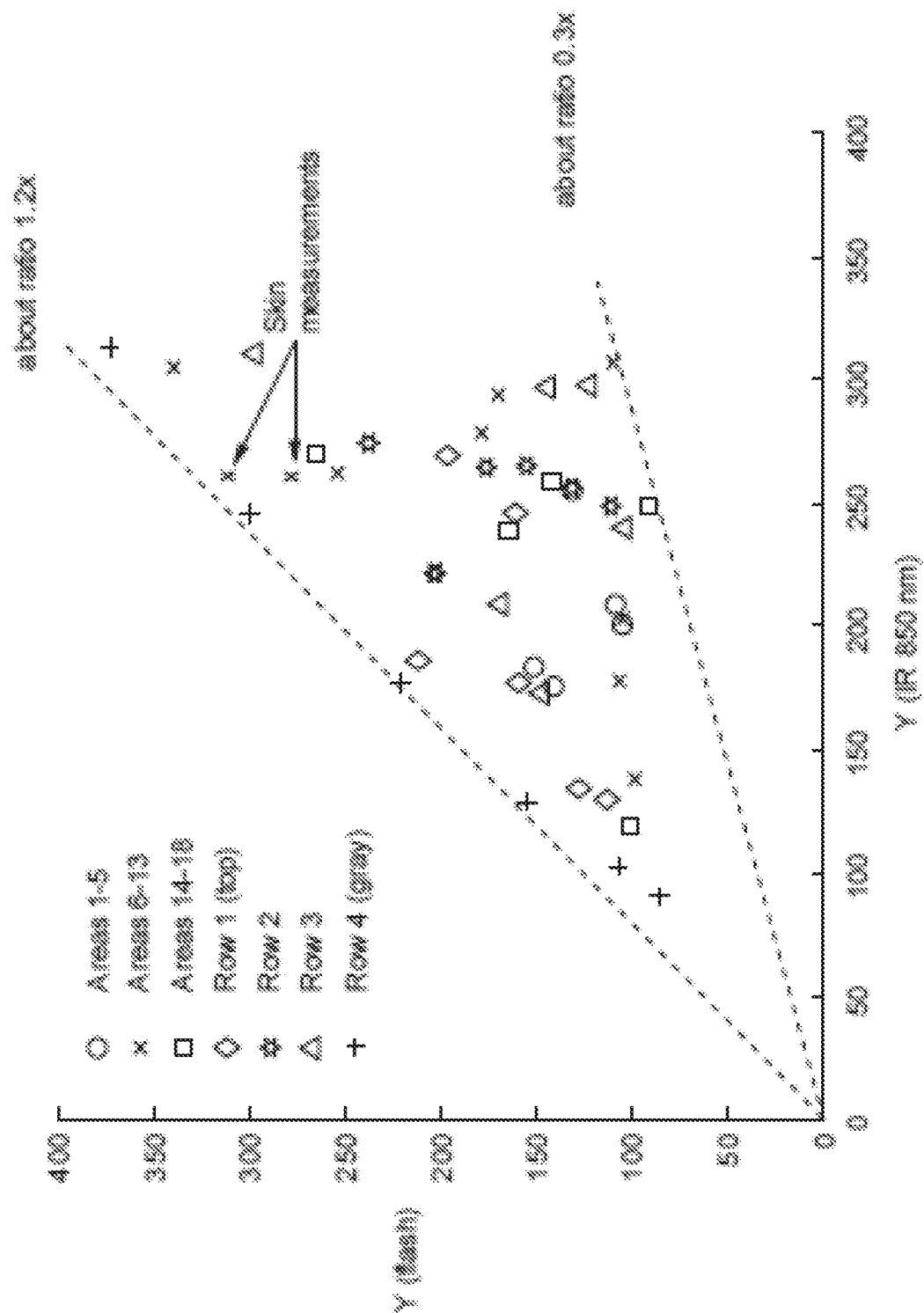
FIG. 5 is a graph comparing an automatic exposure mechanism using visible light and an automatic exposure mechanism using infrared light.

FIG. 5 is a graph comparing measurements from an automatic exposure mechanism using visible light and measurements from an automatic exposure mechanism using infrared light. As illustrated in FIG. 4, the signal received from the target scene when illuminated with the visible light versus when illuminated with infrared light varies from 0.3× to 1.2×. This demonstrates that automatic exposure determined by infrared light can be used to calculate reasonable exposure settings for the visible light. To avoid over-exposure, the visible exposure settings will be set to a lower ratio and can thereby be off from the optimal settings by a factor of 3.

Image noise is a random variation of brightness or color information in images and is typically an aspect of several noise sources, of which the shot noise is generally the largest. Shot noise is a consequence of the particle nature of photons and is due to the statistic variations of photons being collected over time. Shot noise increases with the square root of the number of photons. Therefore, in general, the lower the photon count, the worse the Signal to Noise Ratio (SNR). The number of photons collected by one pixel of an image sensor is proportional to the brightness of the image, as well as the exposure time and pixel size.

Image noise may be produced by an image sensor. The noise level from white areas of an image capture system using infrared light pre-flash with the above-mentioned downscaling of a factor of 3, is illustrated in FIGS. 6A and 6B. The noise of an image capture system using visible light pre-flash is illustrated in FIG. 6C for comparison.

Figure 6C:
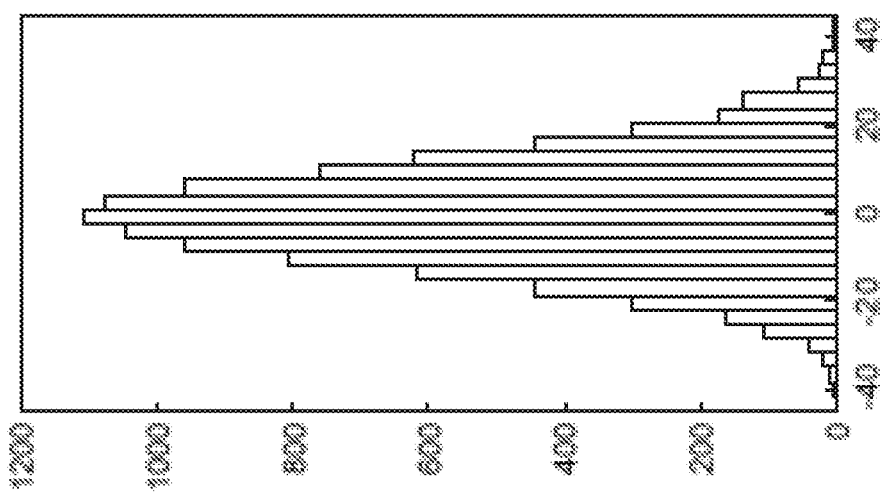
FIG. 6C is a graph illustrating the noise level from white areas when visible light is used during pre-flash and flash.
Figure 6B:
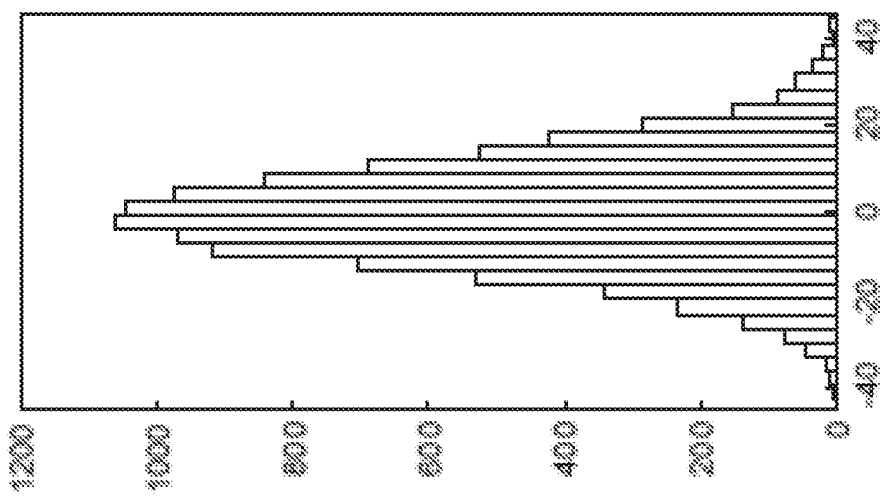
FIG. 6B is a graph illustrating the noise level from white areas when infrared light is used during pre-flash and the ISO for visible flash is decreased.
Figure 6A:
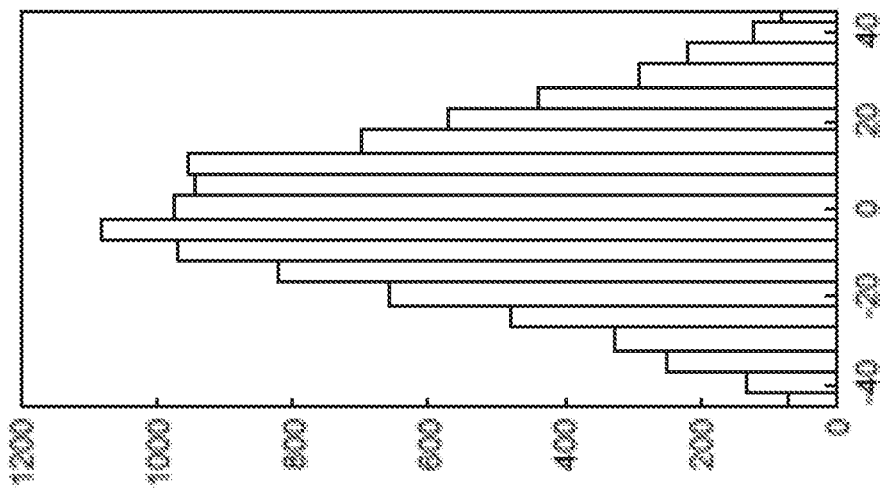
FIG. 6A is a graph illustrating the noise level from white areas when infrared light is used during pre-flash and the exposure time for visible flash is decreased.

FIG. 6C illustrates optimum exposure functions with an ISO set to 400 and an exposure time of 30 ms. In FIG. 6A, the ISO is also set to 400, but the exposure time for the visible flash is reduced to 10 ms, and the amplification is set to 3. The exposure time for the visible flash is reduced as a way to avoid overexposure. When the exposure time is reduced to 10 ms, the image noise slightly increases, as illustrated by a comparison of FIGS. 6A and 6C. This is caused by the increase in shot noise when the exposure time is reduced.

FIG. 6B illustrates that infrared light pre-flash can be used to determine exposure settings without significantly increasing noise. In FIG. 6B the ISO is 133, the exposure time is 30 ms, and the amplification is set to 3. Therefore, FIG. 6B simulates underexposed settings when infrared light is used during pre-flash. A comparison of FIGS. 6B and 6C demonstrates that underexposure can be corrected without an increase in image noise. As such, an image capture system which uses infrared light during pre-flash may eliminate the visible light during pre-flash without increasing image noise.

What is claimed is:

1. An image capture system, comprising:
   an illuminator configured to emit infrared light having at least one infrared wavelength and emit visible light having at least one visible wavelength;
   at least one image sensor having a sensitivity to an infrared range of wavelengths that includes the at least one infrared wavelength and a visible range of wavelengths that includes the at least one visible wavelength;
   at least one processor coupled to the illuminator and the at least one image sensor; and
   a memory configured to store instructions, that, when executed by the at least one processor, cause the image capture system to perform operations, the operations comprising:
   emitting infrared light from the illuminator;
   while the infrared light is being emitted, capturing at least one infrared image with the at least one image sensor;
   determining a depth map based on the at least one infrared image;
   determining an infrared exposure setting based on the depth map;
   scaling the infrared exposure setting to determine a visible exposure setting;
   determining an infrared focus setting based on the depth map;
   scaling the infrared focus setting to determine a visible focus setting;
   emitting visible light from the illuminator; and
   while the visible light is being emitted, capturing a visible image with the at least one image sensor using the visible exposure setting and the visible focus setting.

2. The image capture system of claim 1, wherein the illuminator further comprises individually addressable segments each of which is configured to emit the infrared light.

3. The image capture system of claim 1, further comprising at least one of a stereo vision system, a structured lighting system, or an infrared time-of flight sensor to determine the depth map.

4. The image capture system of claim 1, wherein the operations further comprise:
   adjusting white balance settings to pre-defined white balance settings.

5. The image capture system of claim 1, wherein the visible exposure setting differs from the infrared exposure setting and the visible focus setting differs from the infrared focus setting.

6. The image capture system of claim 5, wherein:
   the visible exposure setting includes a visible shutter speed; and
   the infrared exposure setting includes an infrared shutter speed different from the visible shutter speed.

7. An image capture system, comprising:
   an illuminator configured to emit infrared light having at least one infrared wavelength and emit visible light having at least one visible wavelength;
   at least one image sensor having a sensitivity to an infrared range of wavelengths that includes the at least one infrared wavelength and a visible range of wavelengths that includes the at least one visible wavelength;
   at least one processor coupled to the illuminator and the at least one image sensor; and
   a memory configured to store instructions, that, when executed by the at least one processor, cause the image capture system to perform operations, the operations comprising:
   emitting infrared light from the illuminator;
   while the infrared light is being emitted, capturing at least one infrared image with the at least one image sensor;
   determining a depth map based on the at least one infrared image;
   determining an infrared exposure setting based on the depth map;
   scaling the infrared exposure setting to determine a visible exposure setting;
   determining a visible focus setting based on the depth map;
   emitting visible light from the illuminator; and
   while the visible light is being emitted, capturing a visible image with the at least one image sensor using the visible exposure setting and the visible focus setting.

8. The image capture system of claim 7, wherein the illuminator further comprises individually addressable segments each of which is configured to emit the infrared light.

9. The image capture system of claim 7, further comprising at least one of a stereo vision system, a structured lighting system, or an infrared time-of flight sensor to determine the depth map.

10. The image capture system of claim 7, wherein the operations further comprise:
    adjusting white balance settings to pre-defined white balance settings.

11. The image capture system of claim 7, wherein the visible exposure setting differs from the infrared exposure setting.

12. The image capture system of claim 11, wherein:
    the visible exposure setting includes a visible shutter speed; and
    the infrared exposure setting includes an infrared shutter speed different from the visible shutter speed.

13. A method for capturing an image, the method comprising:
    emitting infrared light from an illuminator;
    while the infrared light is being emitted, capturing at least one infrared image with at least one image sensor;
    determining a depth map based on the at least one infrared image;
    determining an infrared exposure setting based on the depth map;
    scaling the infrared exposure setting to determine a visible exposure setting;
    determining an infrared focus setting based on the depth map;
    scaling the infrared focus setting to determine a visible focus setting;
    emitting visible light from the illuminator; and while the visible light is being emitted, capturing a visible image with the at least one image sensor using the visible exposure setting and the visible focus setting.

14. The method of claim 13, wherein the illuminator further comprises individually addressable segments each of which is configured to emit the infrared light.

15. The method of claim 13, wherein determining the depth map comprises using at least one of a stereo vision system, a structured lighting system, or an infrared time-of flight sensor to determine the depth map.

16. The method of claim 13, wherein the visible exposure setting differs from the infrared exposure setting and the visible focus setting differs from the infrared focus setting.

17. The method of claim 13, wherein:
the visible exposure setting includes a visible shutter speed; and
the infrared exposure setting includes an infrared shutter speed different from the visible shutter speed.

\* \* \* \* \*